United States Patent [19]

Bowron

[11] 4,426,062

[45] Jan. 17, 1984

[54] FLUID FLOW CONTROL VALVES

[75] Inventor: Howard J. Bowron, Maidenhead, England

[73] Assignee: Black & Decker Inc., Newark, Del.

[21] Appl. No.: 347,556

[22] Filed: Feb. 10, 1982

[51] Int. Cl.³ .............................................. F16L 55/14
[52] U.S. Cl. ...................................... 251/7; 251/342; 239/576
[58] Field of Search ...................... 137/844; 251/7, 342

[56] References Cited

U.S. PATENT DOCUMENTS

| 15,192 | 6/1856 | Peale | 137/844 |
| 517,180 | 3/1894 | Wilson | 251/7 |
| 3,525,357 | 8/1970 | Koreski | 251/7 |

FOREIGN PATENT DOCUMENTS

| 110107 | 12/1926 | Fed. Rep. of Germany | 251/7 |
| 1490349 | 11/1977 | United Kingdom . | |
| 1498398 | 1/1978 | United Kingdom . | |
| 2050578 | 1/1981 | United Kingdom . | |

Primary Examiner—A. Michael Chambers
Attorney, Agent, or Firm—Edward D. Murphy; Harold Weinstein

[57] ABSTRACT

A duck bill valve used to control fluid flow is contained in a sleeve whose wall is apertured to permit the application to the flaps of the valve of radial pressure to open the valve and permit fluid flow. A button located on the sleeve is provided to enable a user to apply the radial pressure when the valve is to be opened.

12 Claims, 8 Drawing Figures

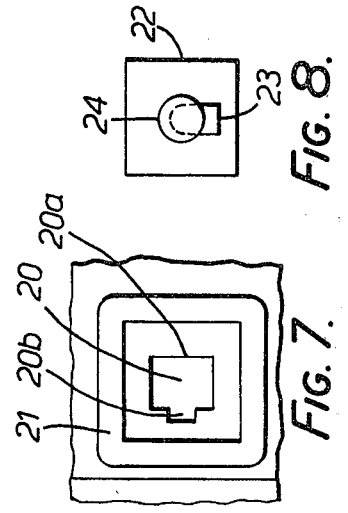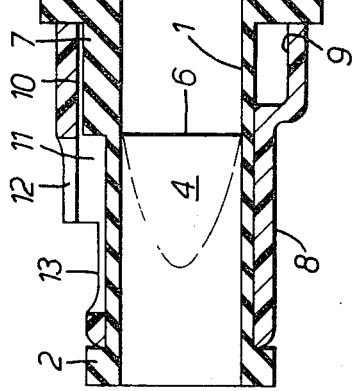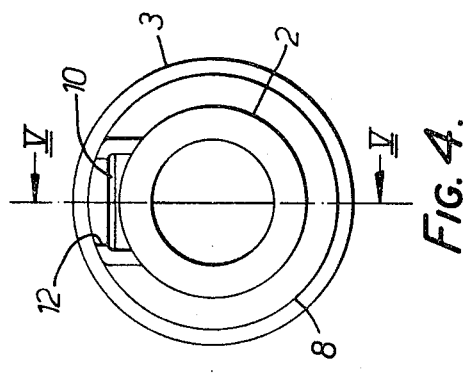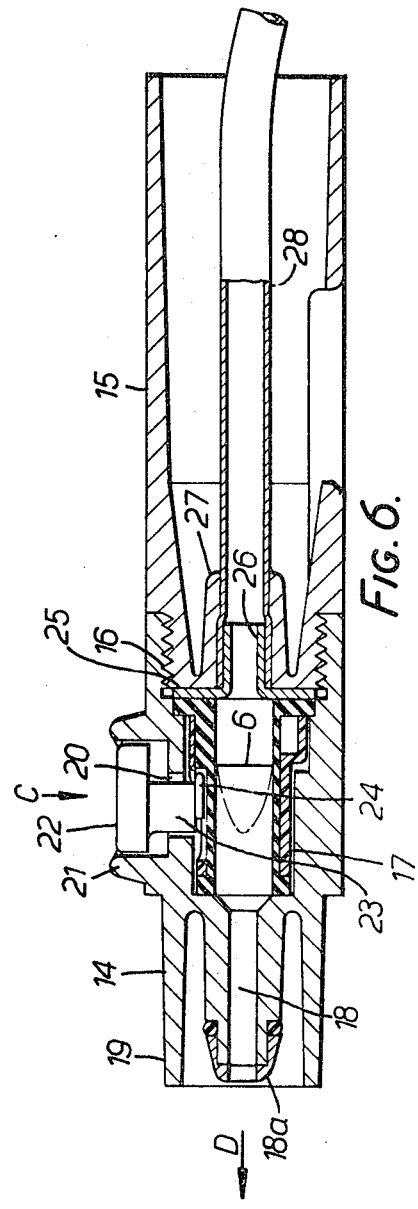

FLUID FLOW CONTROL VALVES

FIELD OF THE INVENTION

This invention relates to fluid flow control valves and has particular but not exclusive reference to the flow control of gases and liquids in which back pressure develops when the flow control valve is closed.

SUMMARY OF THE INVENTION

According to the present invention a fluid flow control valve comprises a resilient tube and a non-return valve mounted within the tube and in which the arrangement is such that an external pressure applied to the tube in the vicinity of the valve distorts the tube and actuates the valve to an open position to permit fluid flow.

In one embodiment the flexible tube has internal flexible flaps arranged to form a "duck bill" non-return valve and in this case opening pressure is applied radially to the tube in a direction parallel to the free ends of the flaps and slightly downstream of the free ends.

To identify the correct point of application of the pressure, the outer surface of the tube may be marked appropriately or be formed with a small excrescence.

Alternatively, the tube may be mounted in a housing which also accommodates an arrangement for applying pressure to the tube at the correct point and in the required direction.

In one embodiment of the invention, the flexible tube is located within a rigid sleeve apertured to permit the application of said force to the tube.

Preferably, the flexible tube is formed or provided with locating means which ensure correct orientation of the tube when positioned in the sleeve.

The means for applying the force may comprise a button contoured to engage and be retained in position by a locating pocket formed externally on the sleeve.

The sleeve and flexible tube may be mounted in a housing which forms a handle by which the assembly is held by a user, the housing being apertured to provide access to the aperture in the sleeve. The housing may also have locating surfaces for ensuring the correct orientation of the sleeve within the housing.

BRIEF DESCRIPTION OF THE DRAWINGS

By way of example, an embodiment of the invention will now be described in greater detail with reference to the accompanying drawings of which:

FIG. 4 is an end view of the component of FIG. 1 mounted in a sleeve support,
FIG. 5 is a section on the line V—V of FIG. 4,
FIG. 6 is a section of a flow control valve assembly,
FIG. 7 is a scrap view of a detail of the assembly of FIG. 6, and,
FIG. 8 is an underneath view of a component of the assembly of FIG. 6.

DETAILED DESCRIPTION OF THE PREFERRED EMBODIMENT

Figure 1:
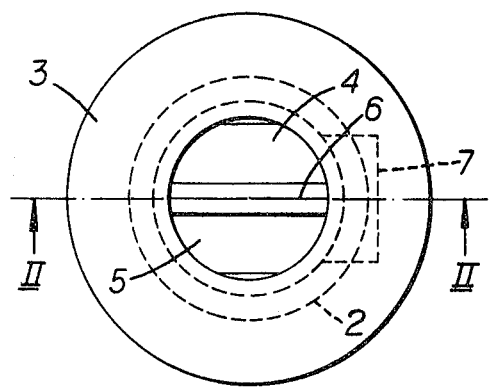
FIG. 1 is an end elevation of a component.
Figure 2:
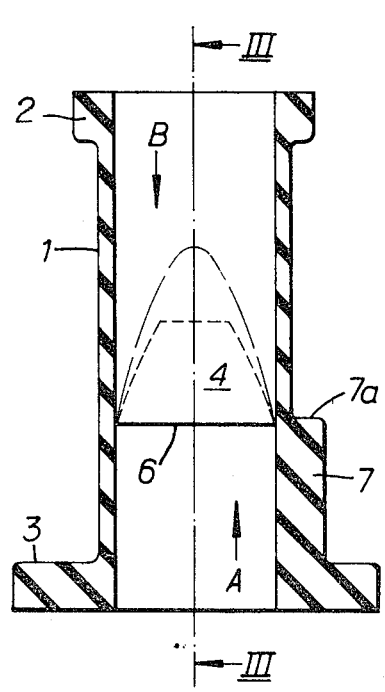
FIG. 2 is a section on the line II—II of FIG. 1.
Figure 3:
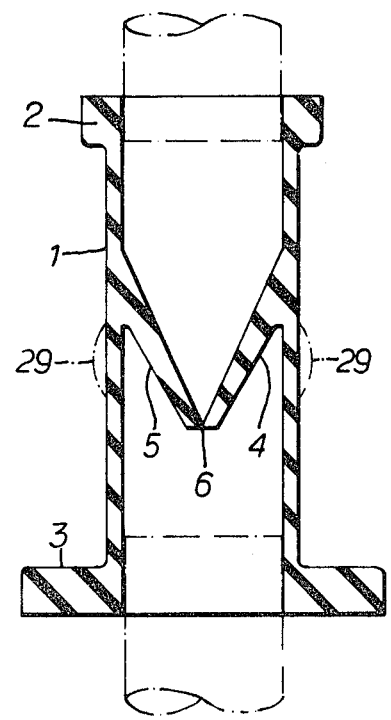
FIG. 3 is a section on the line III—III of FIG. 2.

FIGS. 1-3 show the flow control valve itself. A generally tubular one-piece component includes a tubular body 1 flanged at one end as at 2 and at the other with a larger flange 3 and formed internally with inclined flaps 4, 5. The flaps 4, 5 are integral with the body 1 being joined thereto at the roots and along the sides of the flaps. The ends of the flaps are separable along the line 6. Together, the flaps 4, 5 constitute the well-known "duck-bill" type non-return valve.

The body 1 also has an external key 7 formed as an extension of the flange 2 and positioned to identify the circumferential location of the line 6, the end face 7a being radially in line with the line 6.

Conveniently, the valve is moulded from rubber although other resilient materials inert with respect to the liquid or gas whose flow is to be controlled may be used.

As shown in FIGS. 1-3, the free edges of the flaps are normally in contact, fluid pressure in the direction of arrow A in FIG. 3 tending to hold the edges together and the valve closed whilst fluid pressure in the direction of arrow B in FIG. 3 opens the edges to permit flow.

When used as a flow control valve, the body 1 is inserted in a fluid flow line, leakage at the ends of the body being prevented by the flanges 2, 3 as will be described in more detail below.

Alternatively, the flanges may be omitted and fluid flow conduits inserted in both ends of the body 1 as indicated in FIG. 3.

By applying pressure to the body 1 in a radial direction parallel to the junction line 6 and slightly downstream of the latter (with respect to fluid flow in the direction of arrow A) the free ends of the flaps 4, 5 can be parted so permitting fluid flow in the direction of arrow A. On release of the pressure, the free edges move into contact so stopping fluid flow, this action being assisted by the fluid pressure acting in the direction of arrow A.

To part the edges and so open the valve, the external pressure must be applied at the correct location and this may be indicated on the external surface of the body 1 by, for example, a suitably shaped excrescence.

In one embodiment of the invention, the valve is mounted in a sleeve 8 shown in FIGS. 4 and 5. The sleeve is also of tubular form, the body 1 of the valve being a relatively close fit in the sleeve 8 the bore of which is enlarged at one end as at 9. The enlarged portion 9 has a longitudinal keyway 10 in which key 7 on the valve locates. The keyway 10 extends axially of the sleeve 8 beyond the enlarged portion 9 to provide a pocket 11 whose function will be described below. The outer wall of the keyway 10 is cutaway as at 12 whilst the wall of the sleeve is itself cutaway at 13.

As can be seen from FIG. 5, the overall length of the sleeve 8 is such that it locates between the flanges 2 and 3 at the ends of the body 1 of the valve and is thereby retained in position on the body 1.

The sleeve 8 is moulded from a plastics material and is comparatively rigid.

FIG. 6 is a section of a housing of generally cylindrical form with the assembly shown in FIGS. 4 and 5 mounted in a through bore located along the longitudinal axis of the housing.

The housing is in two parts 14, 15 screwed together by means of co-operating screw threads 16.

Part 14 has an internal chamber 17 sized to accommodate the assembly shown in FIGS. 1 and 5 and having an outlet tube 18 leading from chamber 17. The end of the outlet tube 18 is fitted with a rounded nozzle 18a. Surrounding the outlet tube 18 is a tubular extension 19 of the part 14, the extension forming, with the outlet tube 18, a coupling by means of which the housing can be attached to another component.

The wall of the part 14 is apertured at 20 about midway of the axial length of the chamber 17, the aperture being of rectangular form when viewed in the direction of arrow C and shown in FIG. 7. The longer sides 20a of the rectangle lying at right angles to the longitudinal axis of the housing. That side of the rectangle closer to the outlet tube 18 has a small rectangular recess 20b in it.

The chamber 17 is extended, in the vicinity of aperture 20, to accommodate the keyway 10 on the sleeve 8. In that way, the sleeve 8 and hence the valve is correctly orientated within the part 14 of the housing.

The aperture 20 is bounded by a continuous wall 21 which, when viewed in the direction of arrow C forms a square each side of which is parallel to one side of the rectangular aperture 20.

Positioned inside wall 21 is the square head 22 of a control button whose stem 23, of rectangular transverse cross section, terminates in a circular bearing extension 24 positioned at one end of the stem 23 as can be seen from FIGS. 6 and 8. The upper surface of the head 22 of the control button is curved to conform to the tubular shape of the part 14 and the upper surface of the transverse parts of the wall 21 are similarly curved.

When assembled as shown in FIG. 6, the extension 24 locates in the pocket 11 referred to above and this retains the control button in position. Additionally, the small rectangular recess 20b keys the button in its correct orientation.

Located between the mating ends of the parts 14, 15 is the flanged end 25 of a tubular coupler 26 located in an inlet 27 of part 15, the wall of the coupler being spaced somewhat from the surface of the inlet 27 to permit the end of an inlet tube 28 to be connected to the coupler 26 as shown. The tube 28 passes through part 15 which, as can be seen from FIG. 6 is mainly in the form of a tube.

When the parts 14 and 15 are screwed together the flanges 2 and 3 are compressed between the end surfaces of the rigid sleeve 8 and the adjacent end of part 14 via the flanged end 25 of coupler 26 the adjacent end of part 15. In that way, leakage of fluid is prevented. If necessary to increase the fluid-tightness, stress rings or similar surfaces may be formed on the end face of the flanges.

The extension 24 is so positioned relatively to the flaps 4, 5 that when the control button is depressed, a radially inwardly acting force is applied parallel to line 6 but spaced slightly therefrom towards the roots of the flaps. That force distorts the ends of the flaps remote from the roots and causes these ends to separate.

The valve is used to control flow of fluid in the direction of arrow D, FIG. 6, the pressure of such fluid acting on the inclined flaps 4, 5 to keep the ends thereof lying on line 6 closed so preventing flow from inlet 27 to outlet tube 18.

When the control button 22 is depressed the ends of the flaps open and fluid flow from inlet 27 to outlet 18 can take place. As soon as the button is released, fluid pressure in the inlet 27 acts to close the flap ends and the inherent resiliency of the flaps 4, 5 and tube 1 restores the control button to the position shown in FIG. 6.

It may be found desirable, under some conditions of use, to provide pressure points or areas that act on the flaps 4, 5 in such manner as to urge the free ends together more firmly. Such pressure points or areas may be provided by an external thickening of the wall of the tubular body 1 in the vicinity of the flaps 4, 5 but over areas diametrically opposed to one another and lying on each side of the line 6. Such thickened parts are shown in FIG. 3 by the dotted line 29.

When the flow control valve is inserted into the sleeve 8 inwardly-directed forces are created which act on the flaps 4, 5 to close them more firmly.

It will be appreciated that a similar result could be achieved by forming inwardly-extending projections on the inner surface of the sleeve 8 itself.

The housing shown in FIG. 6 is suitable for use with a pressurised paint supply system that feeds paint from a container (not shown) via tube 28 to an applicator (also not shown) that is connected to outlet 18 of part 14 of the housing.

It will be appreciated from the foregoing desciption that paint flows to the applicator only when the control button 22 is depressed and that otherwise the paint pressure in tube 28 keeps the ends of the flaps 4, 5 tightly closed so preventing leakage.

It will also be appreciated that the relatively simple structure of the valve formed by flaps 4, 5 facilitates cleaning after use. If water soluble paints are used, paint remaining in the control valve assembly can readily be flushed out merely by connecting outlet tube 18 to a water tap, the water pressure forcing apart the ends of the flaps to allow water to flow freely from outlet tube 18 to inlet 27 and along the pipe 28 without the need to operate the button 22.

The flow control valve can be used to control the flow of fluids other than paints. It could, for example, be used to control the flow of air from a hydraulic brake system during a so-called "bleeding" operation.

It will also be understood that other means than the control button described above of applying opening pressure to the ends of the flaps may be used. The means must, of course, allow the application of sufficient pressure to open the flap ends against the closing pressure they may experience from fluid acting on them. Additionally, the flaps must be sufficiently rigid to allow them to open against such fluid pressure. If the flanges are insufficiently rigid, opening pressure tends to distort the entire valve without opening the flap ends.

I claim:
1. A control valve, comprising:
a resilient tube;
a duckbill valve mounted within the tube and operable to an open position by an external pressure applied to the tube in the vicinity of the valve to distort the tube and thereby open the valve;
the resilient tube being located within a rigid sleeve apertured to permit the application to the tube of the external pressure;
the tube having locating means, mating locating means being provided on the sleeve for co-operation with the locating means on the tube to orientate the tube within the sleeve;
an operating member for applying the external pressure to the tube, the operating member having a stem portion;
the sleeve having a pocket adapted to receive said stem portion and to locate said stem portion in a position in which pressure applied to the tube by said operating member opens the valve;
said tube having a flange at each end engaging a respective end of said sleeve whereby said sleeve is retained in axial position between the flanges; and a housing with a through bore adapted to accommodate the sleeve, the housing having an aperture positioned adjacent to the pocket in the sleeve, the operating member extending through the aperture.

2. A control valve as claimed in claim 1 in which the flange at one end of the tube is adapted to seal against a mating face in the housing, and in which the housing is of two part construction, the flange at the other end of the tube forming a seal between the two parts of the housing.

3. A control valve as claimed in claim 2 in which the aperture in the housing has a recess to enable the stem of the operating member to be orientated in a position permitting the stem to engage the pocket in the sleeve.

4. A fluid flow control valve, comprising:
 a housing having a longitudinal axis, a cavity in said housing extending along said longitudinal axis and having an inlet at one end and an outlet at the other end, and said housing having an aperture therein communicating with said cavity intermediate said inlet and said outlet;
 a resilient tube having a flange at each end and a duck-bill valve mounted in the tube intermediate the flanges;
 a rigid sleeve having a cutaway therein intermediate the length thereof, said resilient tube being located within said sleeve with the ends of said sleeve engaging said flanges to axially locate said sleeve on said resilient tube;
 said rigid sleeve and resilient tube being located in said cavity with said cutaway communicating with said aperture and said inlet and outlet communicating with opposite ends of said resilient tube;
 a pocket formed in said sleeve intermediate the ends thereof and located adjacent said cutaway; and
 a manually operable member having a stem disposed and movable through said aperture, said stem having an end portion engaged in and located by said pocket, said end portion being so located that when said manually operable member is depressed said end portion applies pressure to the resilient tube to open said duck-bill valve.

5. The fluid flow control valve of claim 4, wherein said stem is of rectangular transverse cross section and said end portion is a circular bearing extension of said stem.

6. The fluid control valve of claim 5, wherein said aperture is rectangular and has a recess in one side which is engaged by said stem to key said manually operable member in the correct location for said end portion to engage in said pocket.

7. The fluid flow control valve of claim 4, wherein said resilient tube has an axial key adjacent one of said flanges, said rigid sleeve has an enlarged portion at one end thereof, said enlarged portion having an axial keyway therein in which said key engages, and said cavity is extended in the vicinity of said aperture to accommodate said keyway and correctly orientate said duckbill valve in said housing.

8. The fluid flow control valve of claim 7, wherein said pocket is formed by part of said keyway.

9. The fluid flow control valve of claim 4, wherein said aperture is bounded by a wall, and said manually operable member has a control button mounted on said stem and located inside said wall.

10. The fluid flow control valve of claim 4, wherein said flanges are compressed between the ends of said rigid sleeve and the ends of said cavity.

11. The fluid flow control valve of claim 10, wherein said duckbill valve comprises two flaps formed integrally with said resilient tube.

12. The fluid flow control valve of claim 4, wherein said duckbill valve comprises two flaps connected to said resilient tube and closed against each other, the free ends of the flaps abutting in a line, and further comprising external thickening of the wall of said tube in the vicinity of said flaps, said thickening extending over two areas diametrically opposed to one another and located on opposite sides of said line, said areas of thickening engaging the inner surface of said sleeve whereby said flaps are closed more firmly.

* * * * *